(12) United States Patent
Kim et al.

(10) Patent No.: US 11,733,882 B2
(45) Date of Patent: Aug. 22, 2023

(54) MEMORY DEVICE AND METHOD OF CONTROLLING POWER OF THE SAME

(71) Applicant: SAMSUNG ELECTRONICS CO., LTD., Suwon-si (KR)

(72) Inventors: Nam-Hoon Kim, Suwon-si (KR); Jae Sub Kim, Seoul (KR); Jae Won Song, Goyang-si (KR); Se Jeong Jang, Hwaseong-si (KR)

(73) Assignee: SAMSUNG ELECTRONICS CO., LTD.

( * ) Notice: Subject to any disclaimer, the term of this patent is extended or adjusted under 35 U.S.C. 154(b) by 59 days.

(21) Appl. No.: 17/094,059

(22) Filed: Nov. 10, 2020

(65) Prior Publication Data

US 2021/0055871 A1    Feb. 25, 2021

Related U.S. Application Data

(63) Continuation of application No. 15/984,444, filed on May 21, 2018.

(30) Foreign Application Priority Data

Nov. 10, 2017    (KR) .................. 10-2017-0149423

(51) Int. Cl.
G06F 3/06    (2006.01)
(52) U.S. Cl.
CPC .......... G06F 3/0625 (2013.01); G06F 3/0634 (2013.01); G06F 3/0673 (2013.01)

(58) Field of Classification Search
CPC ..... G06F 3/0625; G06F 3/0634; G06F 3/0673
See application file for complete search history.

(56) References Cited

U.S. PATENT DOCUMENTS

| | | |
|---|---|---|
| 8,161,303 B2 | 4/2012 | Hakamata |
| 8,255,715 B2 | 8/2012 | Kawakami et al. |
| 9,195,293 B1 | 11/2015 | Quillen et al. |
| 9,367,353 B1 | 6/2016 | Ellis et al. |
| 9,563,550 B2 | 2/2017 | Cheng |
| RE46,446 E | 6/2017 | Lasser |
| 9,727,267 B1 | 8/2017 | Sebastian et al. |
| 2005/0125702 A1* | 6/2005 | Huang .................. G06F 1/3203 713/320 |
| 2007/0226403 A1* | 9/2007 | Son ........................ G06F 1/3221 713/320 |

(Continued)

*Primary Examiner* — Jaweed A Abbaszadeh
*Assistant Examiner* — Hyun Soo Kim
(74) *Attorney, Agent, or Firm* — Fish & Richardson P.C.

(57) ABSTRACT

A memory device executes a method of controlling power of the memory device. The memory device includes a host interface which receives a command from a host and controls an access to the memory device by the host, a register which is accessible by the host and includes a plurality of different regions, a memory access monitor which monitors which region of the plurality of regions the host accesses, and in response thereto generates a monitoring signal, and a power control manager which selects a power-up group of modules of the memory device in accordance with the monitoring signal and which supplies power to the selected power-up group of modules while not supplying power to any modules of the memory device not belonging to the selected power-up group.

20 Claims, 11 Drawing Sheets

(56) References Cited

U.S. PATENT DOCUMENTS

| | | |
|---|---|---|
| 2012/0005442 A1* | 1/2012 | Katano .................. G06F 21/80 |
| | | 711/E12.091 |
| 2013/0169309 A1* | 7/2013 | Bickel ...................... H02J 3/46 |
| | | 324/764.01 |
| 2014/0025867 A1* | 1/2014 | Nishimori ........... G06F 12/0246 |
| | | 711/170 |
| 2016/0335019 A1 | 11/2016 | Li |
| 2017/0060208 A1 | 3/2017 | Sawai et al. |
| 2017/0115723 A1 | 4/2017 | Shurin et al. |
| 2017/0115913 A1 | 4/2017 | Bass, Jr. et al. |
| 2017/0220086 A1 | 8/2017 | Suzuki |
| 2019/0065086 A1* | 2/2019 | Margetts ............... G06F 3/0659 |

* cited by examiner

BLK

BLKb

|   | Command Controller (220) | Processing Core (230) | Volatile Memory (240) | Memory Controller (250) | NVM (260) |
|---|---|---|---|---|---|
| ① | UP | UP | UP | DOWN | DOWN |
| ② | UP | UP | UP | UP | UP |
| ③ | UP | UP | DOWN | DOWN | DOWN |
| ④ | UP | DOWN | UP | DOWN | DOWN |

FIG. 12

|   | Command Controller (220) | Processing Core (230) | Volatile Memory (240) | Memory Controller (250) | NVM (260) |
|---|---|---|---|---|---|
| ① | UP | UP | UP | DOWN | DOWN |
| ② | UP | UP | UP | UP | UP |
| ③ | UP | UP | DOWN | DOWN | DOWN |
| ④ | UP | UP | UP | DOWN | DOWN |
| ⑤ | UP | UP | UP | UP | UP |
| ⑥ | UP | DOWN | UP | DOWN | DOWN |
| ⑦ | UP | DOWN | UP | DOWN | DOWN |

MEMORY DEVICE AND METHOD OF CONTROLLING POWER OF THE SAME

CROSS-REFERENCE TO RELATED APPLICATION

This is a Continuation of U.S. application Ser. No. 15/984,444, filed May 21, 2018, now U.S. Pat. No. 10,866,748 issued on Dec. 15, 2020, and a claim of priority is made to Korean Patent Application No. 10-2017-0149423 filed on Nov. 10, 2017, in the Korean Intellectual Property Office, and all the benefits accruing therefrom under 35 U.S.C. 119, the contents of which in its entirety are herein incorporated by reference.

BACKGROUND

1. Field of the Invention

The present invention relates a memory device and a method of controlling power of the same.

2. Description of the Related Art

In earlier deployment of solid state drives (SSDs), interfaces to a host device which already existed for other storage devices, such as a hard disk (HDD), in particular mainly a Serial Advanced Technology Attachment (SATA), were also employed for connecting an SSD to the host.

However, with the SATA interface it was difficult to deal with the speed of solid state drives. Accordingly, a Peripheral Component Interconnect express (PCIe) interface which is used for a graphics card and the like has emerged as a new way of connecting an SSD to a host.

Since the PCIe is not optimized to utilize the advanced host controller interface (AHCI) used for existing SATA devices, it was possible to execute the connection with the host most quickly and efficiently, using an NVM Express (NVMe) or a non-volatile memory host controller interface (NVMHCI) specification.

However, in the case of the NVME or NVMHCI interface, when the standby power consumption is reduced, a latency may occur in the power-up operation.

SUMMARY

An aspect of the present invention provides a memory device which reduces or minimizes delay of the power-up operation thereof, while reducing or minimizing its standby power consumption.

Another aspect of the present invention provides a power control method for a memory device which reduced or minimizes delay of the power-up operation thereof, while reducing or minimizing its standby power consumption.

However, aspects of the present invention are not restricted to the ones set forth herein. The above and other aspects of the present invention will become more apparent to one of ordinary skill in the art to which the present invention pertains by referencing the detailed description of the present invention given below.

According to an aspect of the present inventive concept, there is provided a memory device comprising: a host interface which is configured to receive a command from a host and which is further configured to control an access of the host to the memory device; a register which is accessible by the host and includes a plurality of regions; a memory access monitor which is configured to monitor which region of the plurality of regions the host accesses, and which is further configured to generate a monitoring signal in response thereto; and a power control manager which is configured to select a power-up group of selectively-powered modules of the memory device in accordance with the monitoring signal, and which is further configured to supply power to the selected power-up group of selectively-powered modules while not supplying power to any of the selectively-powered modules of the memory device which do not belong to the selected power-up group.

According to another aspect of the present inventive concept, there is provided a memory device comprising: a host interface which is configured to receive a command from a host, and which is further configured to control an access of the host to the memory device; a register which is accessible by the host and includes a plurality of different regions; a command controller which is configured to decode the command; a processing core which is configured to execute the command; a memory access monitor which is configured to monitor a write operation of the register by the host to generate a monitoring signal; and a power control manager which is configured to select a power-up group of selectively-powered modules of the memory device, in accordance with the monitoring signal, and which is further configured to supply power to the selected power-up group of selectively-powered modules, while not supplying power to any of the selectively-powered modules not belonging to the selected power-up group.

According to still another aspect of the present inventive concept, there is provided a memory device comprising: a register which includes first and second regions accessible by a host; a memory access monitor which is configured to generate a first monitoring signal when the host performs a write operation in the first region, and to generate a second monitoring signal when the host performs a write operation in the second region; and a power control manager which is configured to supply power to a first power-up group of selectively-powered modules of the memory device upon receiving the first monitoring signal and to supply the power to a second power-up group of the selectively-powered modules of the memory device upon receiving the second monitoring signal, wherein the first power-up group is not the same as the second power-up group.

According to an aspect of the present inventive concept, there is provided a method of controlling a power consumption of a memory device, the method comprising: receiving a command pointer from a host and writing the command pointer in a register including a plurality of regions accessible by the host; monitoring to which region of the register the command pointer is written, to generate a monitoring signal; selecting a power-up group of selectively-powered modules of the memory device in accordance with the monitoring signal; and selectively supplying power to the selected power-up group of selectively-powered modules while not supplying power to any of the selectively-powered modules of the memory device not belonging to the selected power-up group.

According to yet another aspect of the inventive concept, a method is provided for supplying power to elements of a memory device which includes a processing core which is configured to execute a command received from a host, a nonvolatile memory which is configured to store data, a nonvolatile memory controller which is configured to control the nonvolatile memory, a volatile memory which is accessible by the processing core for executing the command, and a register which includes first and second regions accessible by the host. The method comprises: receiving a command pointer from a host and writing the command pointer in one of the first region and the second region; generating a first monitoring signal when the host performs a write operation in the first region, and generating a second monitoring signal when the host performs the write operation in the second region; and supplying power to the volatile memory in response to the first monitoring signal, and not supplying power to the volatile memory in response to the second monitoring signal.

BRIEF DESCRIPTION OF THE DRAWINGS

The above and other aspects and features of the present invention will become more apparent by describing in detail exemplary embodiments thereof with reference to the attached drawings.

FIG. 12 is a table illustrating a power-up module for each region in which a host of the register of the memory device according to some embodiments performs a write operation.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The problems to be solved by the present invention is not limited to the problems mentioned above, and other problem or problems which are not mentioned can be clearly understood by those skilled in the art from the description below.

Hereinafter, embodiments of a characteristic memory device and method of controlling the power in a memory device will be described with reference to FIGS. 1 to 10c.

Figure 1:
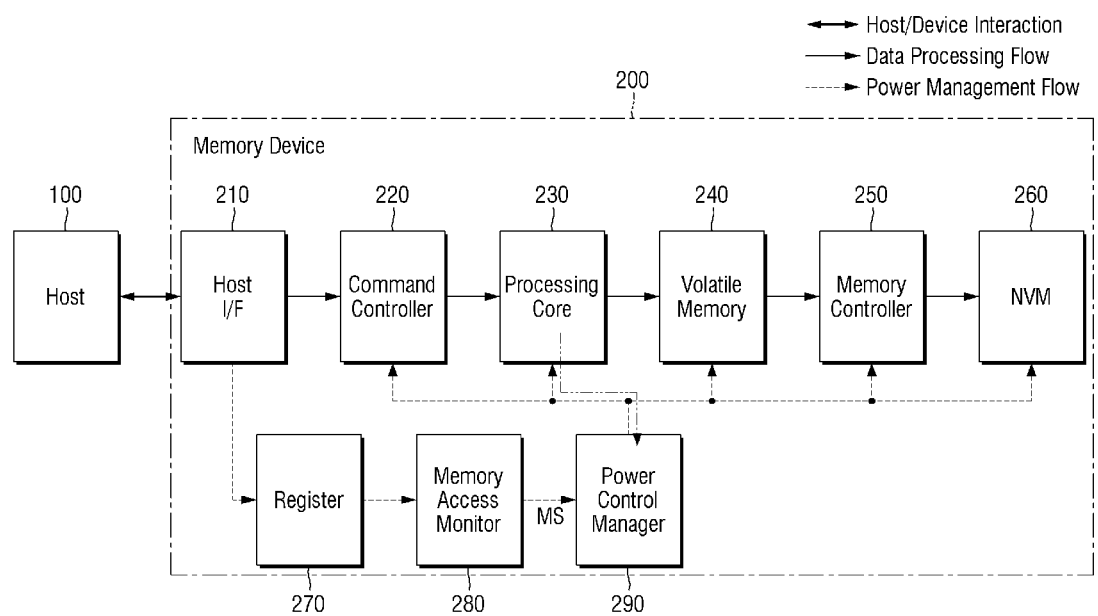
FIG. 1 is a block diagram illustrating a memory device according to some embodiments.
Figure 2:
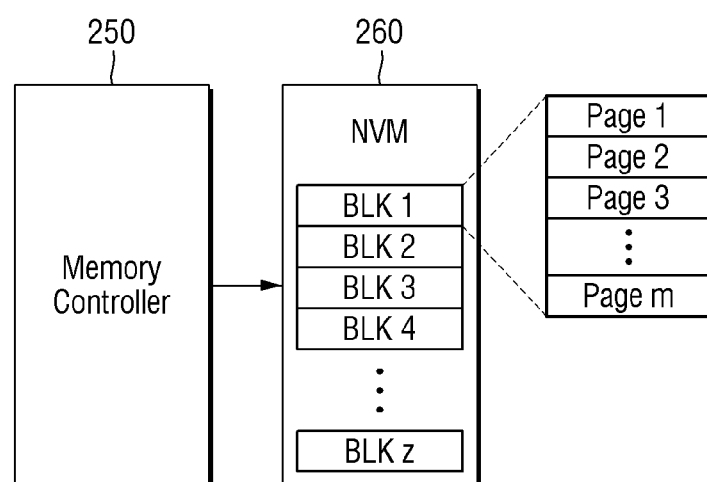
FIG. 2 is a block diagram for explaining a memory controller and a nonvolatile memory of FIG. 1 in detail.
Figure 3:
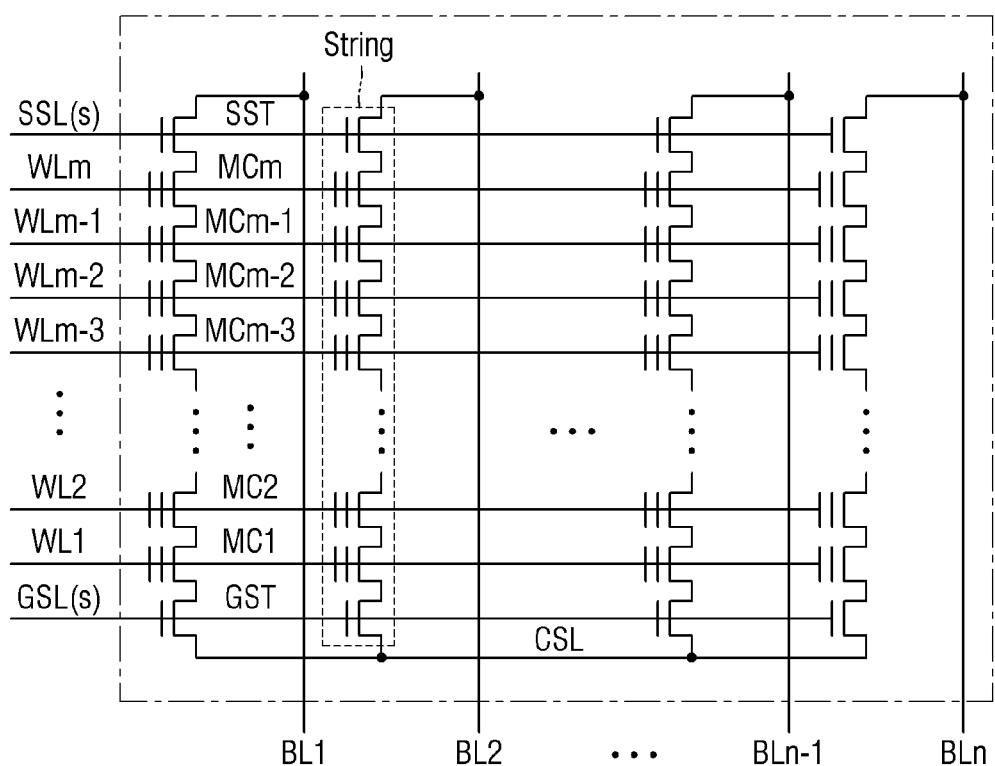
FIG. 3 is an exemplary equivalent circuit diagram of a memory block of the nonvolatile memory of the memory device according to some embodiments.
Figure 4:
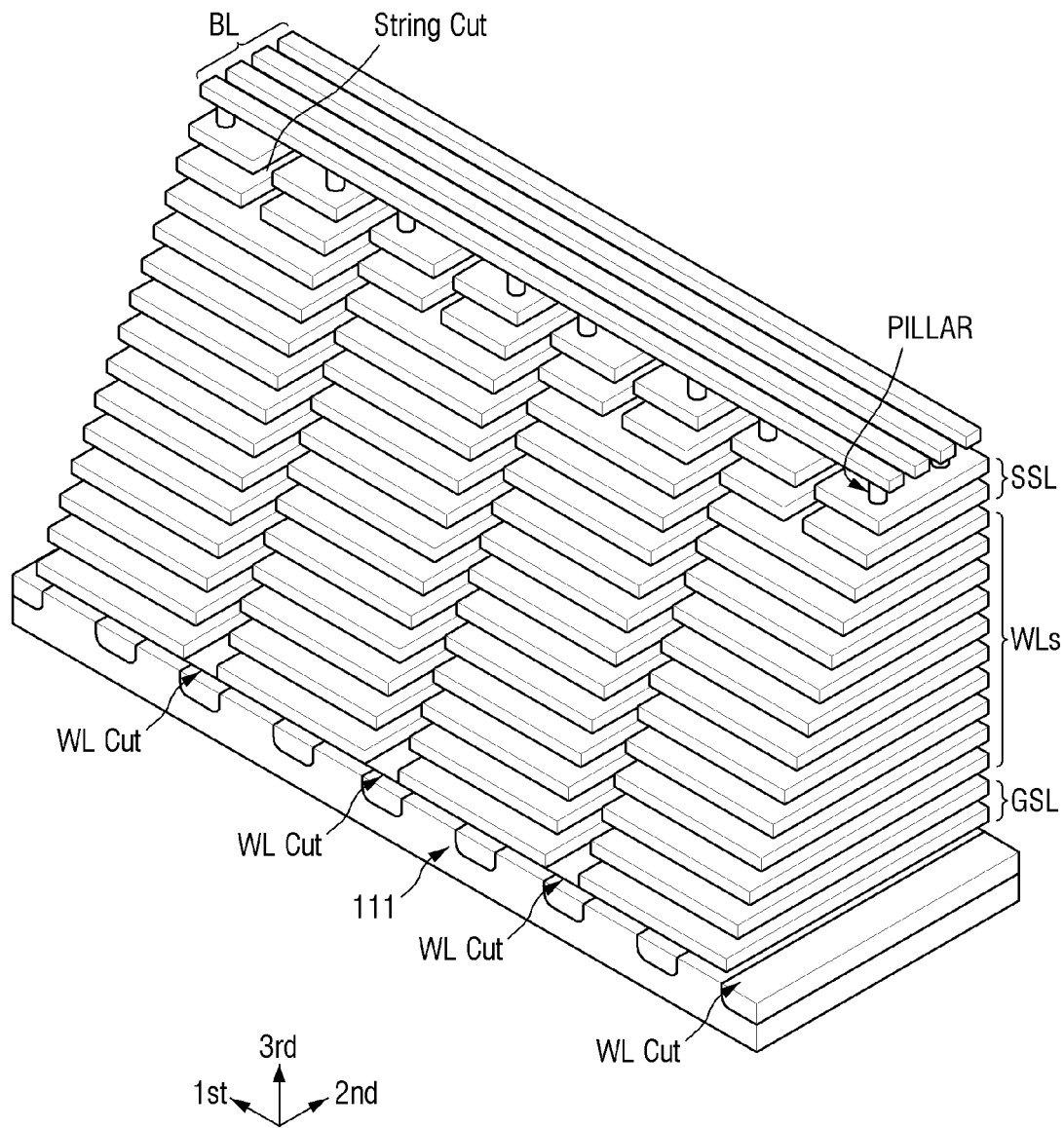
FIG. 4 is a perspective view of the memory block of the nonvolatile memory of the memory device according to some embodiments.
Figure 5:
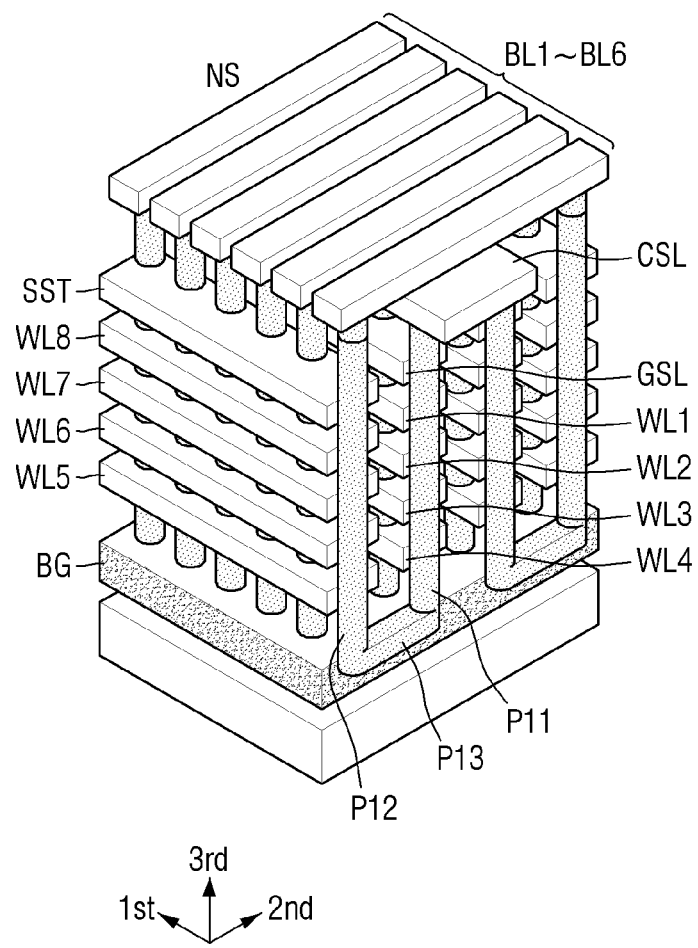
FIG. 5 is a cross-sectional perspective view of the memory block of the nonvolatile memory of the memory device according to some embodiments.
Figure 6:
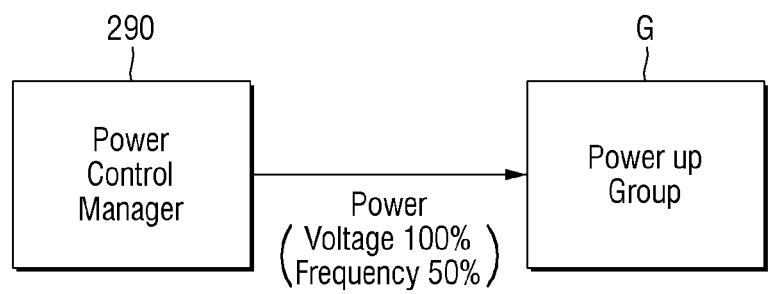
FIG. 6 is a block diagram for explaining the operation of a power control manager of the memory device according to some embodiments.
Figure 7:
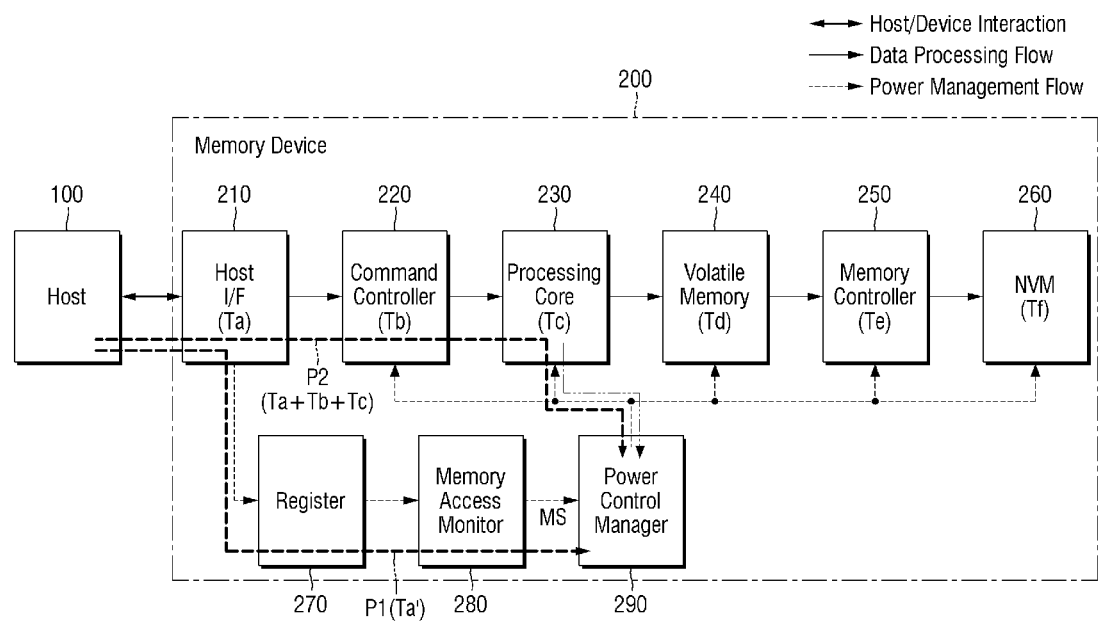
FIG. 7 is a block diagram illustrating a power control flow of the memory device according to some embodiments.
Figure 8:
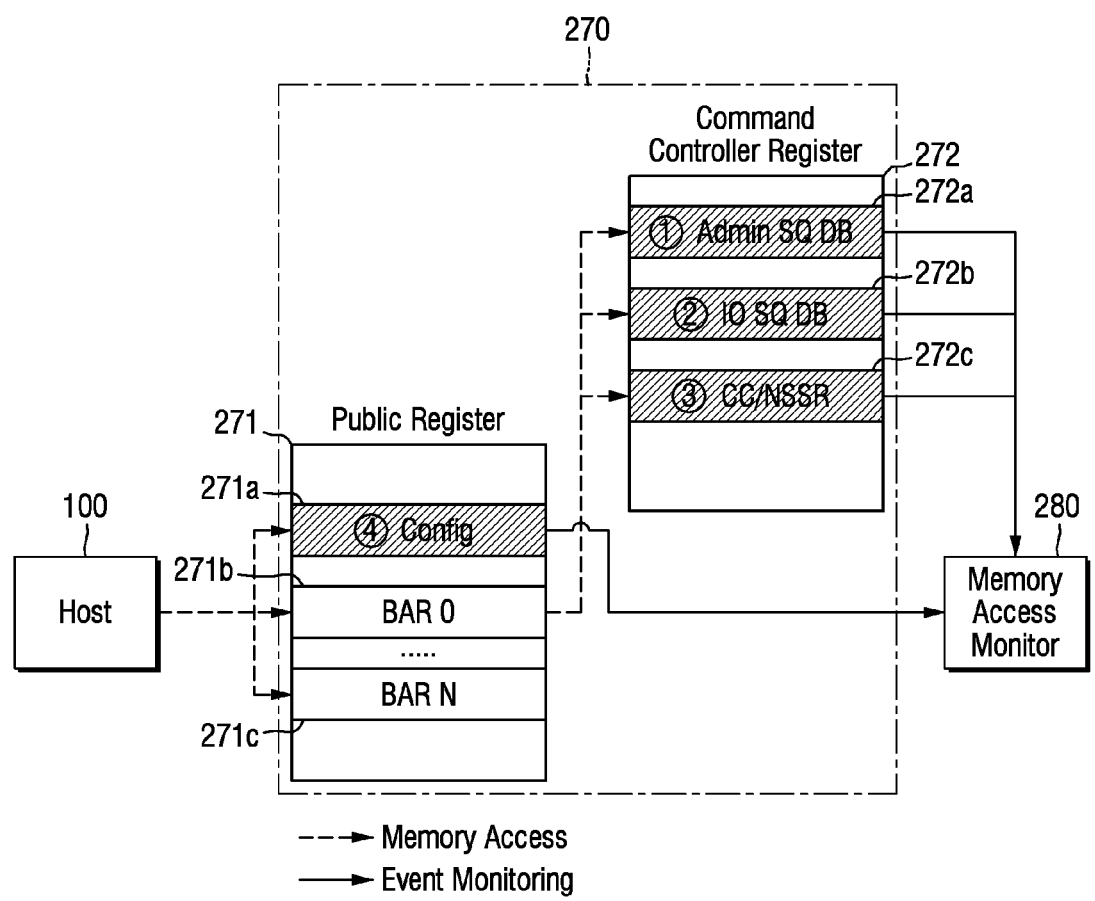
FIG. 8 is a block diagram illustrating an internal structure of a register of the memory device according to some embodiments.
Figures 9, 10A:
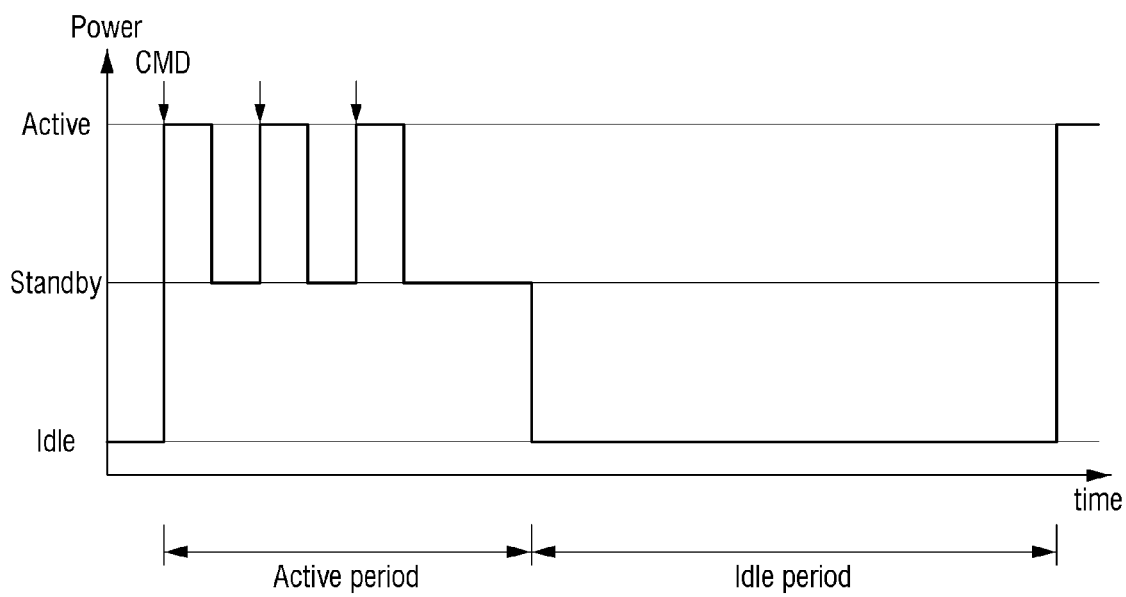
FIG. 9 is a table illustrating a power-up module according to a region in which a host of a register of the memory device according to some embodiments performs a write operation.
FIG. 10a is a graph illustrating the power consumption over time in the related art.
Figure 10B:
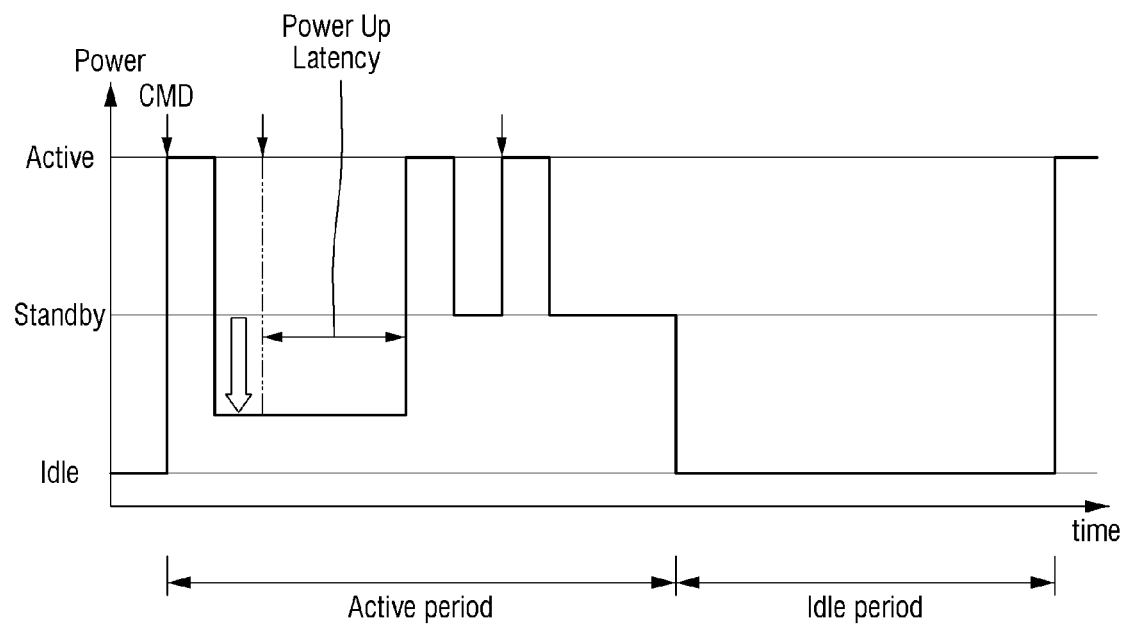
FIG. 10b is a graph illustrating the power consumption over time in the related art.
Figure 10C:
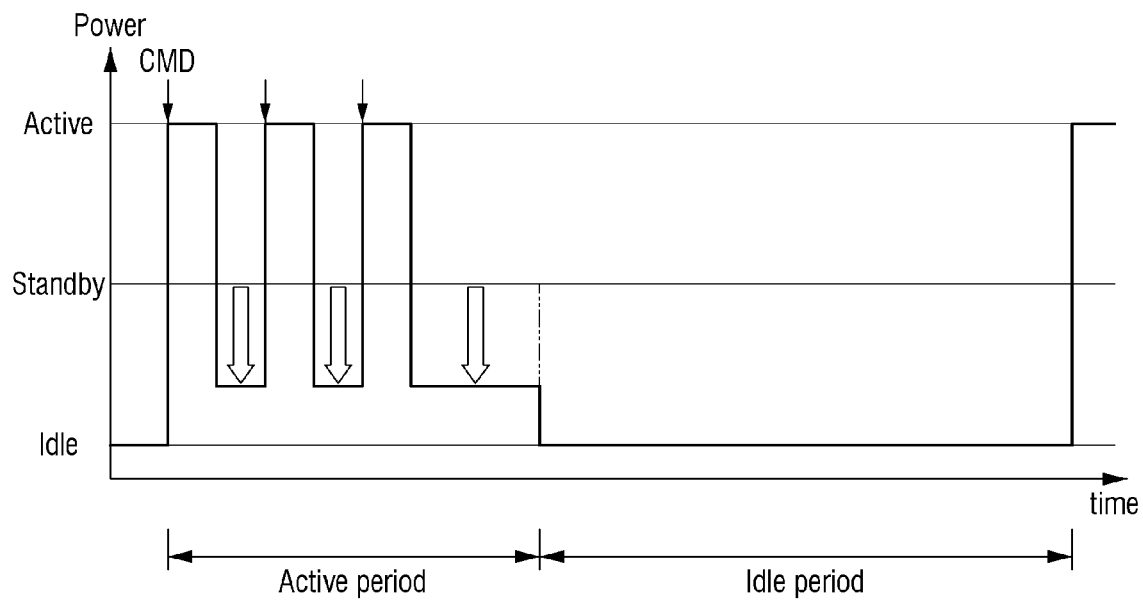
FIG. 10c is a graph illustrating the power consumption over time of the memory device according to some embodiments disclosed herein.

FIG. 1 is a block diagram illustrating a memory device according to some embodiments, and FIG. 2 is a block diagram for explaining a memory controller and a nonvolatile memory of FIG. 1 in detail. FIG. 3 is an exemplary equivalent circuit diagram of a memory block of the nonvolatile memory of the memory device according to some embodiments, and FIG. 4 is a perspective view of the memory block of the nonvolatile memory of the memory device according to some embodiments. FIG. 5 is a cross-sectional perspective view of the memory block of the nonvolatile memory of the memory device according to some embodiments, and FIG. 6 is a block diagram for explaining the operation of a power control manager of the memory device according to some embodiments. FIG. 7 is a block diagram illustrating a power control flow of the memory device according to some embodiments, and FIG. 8 is a block diagram illustrating an internal structure of a register of the memory device according to some embodiments. FIG. 9 is a table illustrating a power-up module according to a region in which a host of a register of the memory device according to some embodiments performs a write operation, and FIG. 10a is a graph illustrating the power consumption over time in the related art. FIG. 10b is a graph illustrating power consumption over time in the related art, and FIG. 10c is a graph illustrating the power consumption over time of the memory device according to some embodiments disclosed herein.

Referring to FIG. 1, a memory system including a memory device 200 according to some embodiments includes a host 100 and memory device 200.

Host 100 may be external to memory device 200 and coupled to memory device 200. Host 100 may be connected to memory device 200 via a host interface 210 which may be included in memory device 200. Host 100 may control a data processing operation (for example, a write operation and a read operation) of memory device 200.

Host 100 may be provided as, but is not limited to, a host processor, an integrated circuit (IC), a motherboard, a system on chip (SoC), an application processor (AP), a mobile AP, a web server, a data server, or a database server.

Memory device 200 may transmit and receive commands and/or data with host 100 via host interface 210. Memory device 200 may be provided as a flash-based storage, but is not limited thereto. For example, memory device 200 may be provided as, but is not limited to, a solid-state drive or solid-state disk (SSD) or an embedded SSD (eSSD).

Host 100 and memory device 200 may be mutually connected to provide a single data processing system. The data processing system may be provided as, but is not limited to, for example, a personal computer (PC), a workstation, a data center, an internet data center (IDC), a direct attached storage (DAS) system, a storage area network (SAN) system, a network attached storage (NAS) system, a redundant array of inexpensive disks or redundant array of independent disks (RAID) system, or a mobile device.

Also, the mobile device may be provided as, but is not limited to, a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, a mobile internet device (MID), a wearable computer, internet of things (IoT) device, internet of everything (IoE) device, a drone or an e-book.

Memory device 200 according to some embodiments includes a host interface 210, a command controller 220, a processing core 230, a volatile memory 240, a memory controller 250, a nonvolatile memory 260, a first register 270, a memory access monitor 280, and a power control manager 290.

Host interface 210, together with a command controller 220 and a first register 270 to be described later, may be a transmission path of commands and/or data between host 100 and memory device 200. According to some embodiments, host interface 210 may be provided as, but is not limited to, a peripheral component interconnect express (PCIe) interface, and a non-volatile memory express (NVMe) interface.

According to some embodiments, host interface 210 may transmit electrical or optical signals. Further, host interface 210 may control the access of host 100 to memory device 200. That is, host interface 210 may allow the access of host 100 to a partial region of first register 270 and may block the access of host 100 to the remaining regions.

Command controller 220 may receive data from host 100 through host interface 210. Command controller 220 may receive commands from host 100 via host interface 210.

Command controller 220 may decode a received command and convert the command into a format that can be interpreted by processing core 230. Further, command controller 220 may fetch the command. Here, fetching may mean loading of a command from host 100.

That is, the method of transmitting the actual command may be a method in which a command pointer is first written in a doorbell region of first register 270, and then the command is fetched from host 100 accordingly. That is, command controller 220 may fetch the command corresponding to the command pointer.

Processing core 230 may perform data processing operations of memory device 200. Specifically, processing core 230 may perform the work of executing a data processing command transmitted by host 100, may refresh nonvolatile memory 260, and the like.

Processing core 230 may execute the command or the command queue decoded by command controller 220. Although the processing core 230 is illustrated as a single block in FIG. 1, processing core 230 may include two or more processing cores. This may enable a faster and more efficient data processing operation.

In principle, processing core 230 may also supply a power-up instruction to power control manager 290 in accordance with a command (shown in FIG. 1 by an arrow heading from processing core 230 to power control manager 290). However, memory device 200 according to some embodiments may operate power control manager 290 via memory access monitor 280, without employing such a scheme.

Volatile memory 240 may store data processing instructions which may be executed by processing core 230. Volatile memory 240 may be, for example, a dynamic random access memory (DRAM). Volatile memory 240 may serve as a buffer memory for performing the aforementioned tasks.

Memory controller 250 may control the transmission or processing of commands and/or data supplied to nonvolatile memory 260. For example, memory controller 250 may write the data transmitted from host 100 to nonvolatile memory 260 and may transmit the data read from nonvolatile memory 260 to host 100.

Nonvolatile memory 260 may include one or more memory cells that substantially store data. Nonvolatile memory 260 may include a three-dimensional NAND flash memory array. A three-dimensional memory array may be monolithically formed on one or more physical levels of a silicon substrate and an array of memory cells having an active region disposed on a circuit associated with the operation of the memory cells. The circuit associated with the operation of the memory cells may be located in the substrate or on the substrate. The term monolithically means that layers of each level of the three-dimensional array are deposited directly on the lower level layers of the three-dimensional array.

Referring to FIG. 2, nonvolatile memory 260 includes a plurality of memory blocks (BLK1 to BLKz, where z is an integer of 2 or more). Each of the plurality of memory blocks (BLK1 to BLKz) includes a plurality of pages (Page 1 to Page m, where m is an integer of 2 or more).

Referring to FIG. 3, a memory block (BLK) includes strings connected to a plurality of bit lines (BL1 to BLn, where n is an integer of 2 or more). Here, each of the strings includes at least one string selection transistor (SST) connected in series between a bit line and a common source line (CSL), a plurality of memory cells (MC1 to MCm, where m is an integer of 2 or more), and at least one ground selection transistor (GST).

Each of the memory cells (MC1 to MCm) may store data of at least one bit or more. Although it is not illustrated, each of the strings may include at least one dummy cell between the string selection transistor (SST) and the memory cells (MC1 to MCm), and at least one dummy cell between the memory cells (MC1 to MCm) and the ground selection transistor (GST).

Referring to FIG. 4, in the illustrated example four sub-blocks are formed on the substrate. The respective sub-blocks are formed by stacking at least one ground selection line (GSL), a plurality of word lines (WLs), and at least one string selection line (SSL) in the form of a plate between the word line cuts (WL cut) on the substrate. Here, at least one string selection line (SSL) is separated into the string selection line cuts (String Cut). On the other hand, a string selection line cut exists in FIG. 4, but the disclosed memory block is not limited thereto. The memory block (BLKa) may be provided so that a string selection line cut does not exist.

The first direction (1st) and the second direction (2nd) intersect with each other, and the third direction (3rd) may intersect with the first direction (1st) and the second direction (2nd). For example, the first direction (1st), the second direction (2nd), and the third direction (3rd) may be directions which are orthogonal to each other.

The ground selection line (GSL), the word lines (WLs), and the string selection line (SSL) extend in the second direction (2nd), and may be spaced apart from each other in the first direction (1st) by the word line cut and the string selection line cut. Further, the ground selection line (GSL), the word lines (WLs), and the string selection line (SSL) may be sequentially stacked in the third direction (3rd).

In some embodiments of the present invention, at least one dummy word line is stacked in the form of a plate between the ground selection line (GSL) and the word lines (WLs), or at least one dummy word line may be stacked in the form of a plate between the word lines (WLs) and the string selection the line (SSL).

Although it is not illustrated, each word line cut includes a common source line (CSL). In the embodiment, the common source lines (CSL) included in each word line cut are commonly connected. When a pillar connected to a bit line penetrates at least one ground selection line (GSL), a plurality of word lines (WLs), and at least one string selection line (SSL), a string is formed.

The structure between the word line cuts is illustrated as a sub-block in FIG. 4, but the present invention is not necessarily limited thereto. For example, the structure between word line cut and the string selection line cut may be denominated as a sub-block.

The block (BLKa) according to the embodiment may be provided as a structure in which two word lines are merged into one piece, in other words, a merged word line structure.

The structure of the block (BLKb) of FIG. 5 may be different from the structure of block (BLKa) of FIG. 4.

Referring to FIG. 5, for the sake of convenience of explanation, the number of floors of the word line is set as 4, but is not limited thereto. The memory block (BLKb) may be provided as a pipe-shaped bit cost scalable (PBiCS) structure in which the lower ends of adjacent memory cells connected in series are connected by a pipe.

The memory block (BLKb) includes m×n strings (NS) (where m and n are natural numbers). In FIG. 5, a case where m=6 and n=2 are illustrated. Each string (NS) includes serially connected memory cells (MC1 to MC8, not labeled in FIG. 5). Here, the first upper ends of the memory cells (MC1 to MC8) are connected to the string selection transistor (SST), the second upper ends of the memory cells (MC1 to MC8) are connected to the ground selection transistor (GST also not labeled in FIG. 5), and the lower ends of the memory cells (MC1 to MC 8) are connected by pipes.

The word lines (WL1 to WL8) extend in the first direction, and the strings (NS) may extend in the second direction. The word lines (WL1 to WL8) and the strings (NS) may be spaced apart from each other in the third direction.

Memory cells constituting the string (NS) are formed by being stacked on a plurality of semiconductor layers. Each string (NS) includes a first pillar (P11), a second pillar (P12), and pillar connecting portion (P13) which connects the first pillar (P11) and the second pillar (P12). The first pillar (P11) is connected to the bit line (e.g., BL1) and the pillar connecting portion (P13), and is formed by penetrating between the string selection line (SSL) and the word lines (WL5 to WL8). The second pillar (P12) is connected to the common source line (CSL) and the pillar connecting portion (P13), and is formed by penetrating between the ground selection line (GSL) and the word lines (WL1 to WL4). As illustrated in FIG. 5, the string (NS) is provided in the form of a U-shaped pillar.

At this time, the first pillar (P11) and the second pillar (P12) extend in the third direction, and the pillar connecting portion (P13) may be connected in the second direction.

In some embodiments, a back-gate (BG) is formed on the substrate and the pillar connection (P13) may be provided inside the back-gate. In the embodiment, the back-gate (BG) may commonly exist in the block (BLKb). The back-gate (BG) may have a structure separated from the back-gate of another block.

Referring again to FIG. 1, first register 270 may form a system bus, like host interface 210 and command controller 220. First register 270 may include a region connected to host interface 210 and directly accessible by host 100. That is, a part of first register 270 may be directly accessed by host 100. In some embodiments of the present invention, first register 270 may include at least one of a nonvolatile memory, a static random access memory (SRAM), a random access memory (RAM), and a dynamic random access memory (DRAM). However, the present embodiment is not limited thereto.

The detailed configuration of first register 270 will be described later in more detail.

Memory access monitor 280 may monitor the internal region of first register 270. That is, since first register 270 can be directly accessed by host 100 via host interface 210, memory access monitor 280 may monitor the region of first register 270 accessed by host 100.

Memory access monitor 280 may generate the monitoring signal (MS) depending on the region of first register 270 accessed by host 100. The monitoring signal (MS) may include information on whether host 100 accesses a specific region in first register 270. Memory access monitor 280 may generate a first monitoring signal when host 100 writes to a first region of first register 270, may generate a second monitoring signal when host 100 writes to a second region of first register 270, etc. Memory access monitor 280 may transmit monitoring signal (MS) to power control manager 290.

Power control manager 290 may receive the monitoring signal (MS) from memory access monitor 280. Power control manager 290 may control the power supplied to each module of memory device 200. That is, power control manager 290 may determine how much power is supplied to which module.

Referring to FIGS. 1 and 6, power control manager 290 may supply the power to a power-up group (G) of modules in memory device 200. At this time, the power-up group (G) may be a group which includes at least one module among the command controller 220, processing core 230, volatile memory 240, memory controller 250, and nonvolatile memory 260.

When power control manager 290 supplies the power to the power-up group (G), the voltage and the frequency may be adjusted. Power control manager 290 may determine the optimum voltage and frequency for an AC power source, which provides the power, by the monitoring signal (MS).

Referring to FIG. 7, it is possible to explain a data processing flow and a power management flow of memory device 200 according to some embodiments. In the data processing flow, the data is transmitted from host 100 to host interface 210, and may be sequentially transmitted to memory controller 250 and nonvolatile memory 260 via command controller 220, processing core 230 and volatile memory 240.

Data transmission between host 100 and host interface 210 takes a first time (Ta), and a second time (Tb) may be taken for command controller 220 to process the data by receiving the data from host interface 210. A third time (Tc) may be taken for processing core 230 to process the data by receiving the data from command controller 220, and a fourth time (Td) may be taken for volatile memory 240 to process the data by receiving the data from processing core 230. Similarly, a fifth time (Te) may be taken up by memory controller 250, and a sixth time (TO may be taken up by nonvolatile memory 260.

In the power control flow, when host 100 transmits a command to host interface 210, host 100 directly accesses first register 270 via host interface 210 and may perform the write operation. Memory access monitor 280 may detect such a write operation, generate the monitoring signal (MS) and transmit it to power control manager 290. Power control manager 290 may select the power-up group (G) to include at least one or more of command controller 220, processing core 230, volatile memory 240, memory controller 250, and nonvolatile memory 260 in accordance with the monitoring signal (MS), and supply the power to the modules belonging to the power-up group, while not supplying power to the modules which do not belong to the power-up group.

The power control flow of memory device 200 according to some embodiments may proceed along the first path (P1). The first path (P1) may take a seventh time (Ta'). The seventh time (Ta') may be the same as or slightly larger than the first time (Ta). That is, the first time (Ta) at which host 100 transmits a command to host interface 210 may be substantially the same as the seventh time (Ta'). This is because the method of transmitting the command starts by performing the write operation in first register 270.

If memory device 200 transmits the signal of the power control to power control manager 290, using the second path (P2) rather than the first path (P1) which utilizes memory access monitor 280, a time (Ta+Tb+Tc) longer than the seventh time (Ta') may be required.

That is, the time obtained by summing the first time (Ta) required for host 100 to transmit the command to host interface 210, the second time (Tb) required for command controller 220 to process the command, and the third time (Tc) required for processing core 230 to process the command may be the time required by the second path (P2).

That is, memory device 200 according to some embodiments may monitor that host 100 performs the write processing on first register 270 to immediately perform the power-up operation. Therefore, memory device 200 according to some embodiments may minimize the time taken for the power-up operation. That is, memory device 200 according to some embodiments may prevent latency of the power-up operation.

Referring to FIG. 8, first register 270 may include a public register region (which may also be referred to as a common register region) 271 and a command controller register region 272.

Public register region 271 may be a storage space for searching for a device or a module by which host 100 is connected to host interface 210. Public register region 271 may not be a space which is actually used by host 100 of the device or the module. Public register region 271 may be a very small space for the allocation of the space used by host 100. That is, public register region 271 may include a plurality of base address registers (BARs) 271b to 271c including address information of a space for being used by host 100.

Public register region 271 may include a configuration region 271a in which the configuration information of host interface 210 is written, and the plurality of base address registers BAR 0 . . . BAR N 271b to 271c. The configuration information stored in configuration region 271a may include basic information such as an ID of a device connected to host interface 210, a vendor ID, a status, and a class code.

Memory access monitor 280 monitors configuration region 271a of public register region 271, and when host 100 accesses configuration region 271a, memory access monitor 280 may detect the access. Memory access monitor 280 may generate the monitoring signal (MS) of FIG. 1, based on the detection.

Base address registers BAR 0 . . . BAR N 271b to 271c may include address information connected to other regions in first register 270. For example, first base address register 271b may include address information connected to command controller register region 272. Accordingly, public register region 271 may indirectly connect host 100 and command controller register region 272.

Command controller register region 272 may include an administrator command doorbell 272a, an input/output command doorbell 272b, and a reset control region 272c.

Administrator command doorbell 272a may be a doorbell of an administrator command. The doorbell may mean a register that serves to cause memory device 200 to report that the command is transmitted from host 100 when host 100 writes a command pointer to the doorbell. Therefore, via the doorbell, memory device 200 may prepare to receive the command before the actual command is transmitted.

Among the commands, the administrator command may mean a command such as an ID inquiry of memory device 200 or a module of memory device 200, a temperature log, etc., rather than a data input/output command. In the case of such a command, there is no need for a write/read operation of data of memory device 200.

Memory access monitor 280 may monitor whether host 100 performs writing of a command pointer in administrator command doorbell 272a, and in response thereto may generate monitoring signal (MS) of FIG. 1.

Input/output command doorbell 272b may be a doorbell of an input/output command. Among the commands, an input/output command may mean a command related to data processing, such as a read command, a write command, and an erase command of data stored in memory device 200. In the case of such a command, it is inevitable to use additional modules such as nonvolatile memory 260 of memory device 200.

Memory access monitor 280 may monitor whether host 100 performs writing of a command pointer in input/output command doorbell 272b, and in response thereto may generate the monitoring signal (MS) of FIG. 1.

Reset control region 272c may be a register region for reset of memory device 200 or a module of memory device 200. That is, reset control region 272c may be a register for reset and shutdown of command controller 220, or reset of a sub-system, or the like. Reset control region 272c may be a controller configuration (CC) register) and/or a NVM subsystem reset control (NSSR) register. In the case of the reset-related commands, it is not necessary to use an additional module such as nonvolatile memory 260 of memory device 200.

Memory access monitor 280 may monitor whether or not host 100 performs writing of a command pointer in reset control region 272c, and in response thereto may generate the monitoring signal (MS) of FIG. 1.

In conclusion, memory access monitor 280 monitors configuration region 271a of public register region 271 of first register 270, administrator command doorbell 272a of command controller register region 272, input/output command doorbell 272b, and reset control region 272c, and it is possible to detect a region written to by host 100. Memory access monitor 280 may generate the monitoring signal (MS) based on the detection.

Referring to FIGS. 1, 6, 8, and 9, it is possible to explain a method of configuring a power-up group (G) of power control manager 290 according to the monitoring signal (MS).

(1): When host 100 performs writing of a command pointer in administrator command doorbell 272a in command controller register region 272 of first register 270, power control manager 290 may select command controller 220, processing core 230 and volatile memory 240 as a select power-up group (G) of selectively-powered modules to perform power-up. On the other hand, power control manager 290 may keep memory controller 250 and nonvolatile memory 260 in the powered-down state.

When an administrator command of host 100 is received, since memory device 200 does not need to write or read data in nonvolatile memory 260, memory controller 250 and nonvolatile memory 260 may not need to be powered-up. As a result, since power control manager 290 does not supply power to memory controller 250 and nonvolatile memory 260 (or supplies only the low power of an idle state or a standby state), it is possible to minimize the overall power consumption of memory device 200.

(2): When host 100 performs writing in input/output command doorbell 272b of command controller register region 272 of first register 270, power control manager 290 may select command controller 220, processing core 230, volatile memory 240, memory controller 250, and nonvolatile memory 260 as the select power-up group (G) of selectively-powered modules to perform the power-up. That is, power control manager 290 may supply power to all modules.

When the input/output command of host 100 is received, since memory device 200 needs to write or read the data on nonvolatile memory 260, power-up of memory controller 250 and nonvolatile memory 260 may be naturally required. Thus, power control manager 290 may supply power to memory controller 250 and nonvolatile memory 260 to perform power-up of all the necessary modules.

(3): When host 100 performs writing in reset control region 272c of command controller register region 272 of first register 270, power control manager 290 may select command controller 220 and processing core 230 as the select power-up group (G) of selectively-powered modules to perform the power-up. On the other hand, power control manager 290 may keep volatile memory 240, memory controller 250 and nonvolatile memory 260 in the powered-down state.

When the reset command of host 100 is received, since memory device 200 does not need to write or read the data on nonvolatile memory 260, memory controller 250 and nonvolatile memory 260 may not need to be powered-up. Also, since volatile memory 240 is also not used in the reset operation, it may not need to be powered-up. Therefore, since power control manager 290 does not supply power to volatile memory 240, memory controller 250 and nonvolatile memory 260 (or supplies only low power in the idle state or the standby state), the overall power consumption of memory device 200 can be minimized.

(4): When host 100 performs writing in configuration region 271a of public register region 271 of first register 270, power control manager 290 may select command controller 220 and volatile memory 240 as the select power-up group (G) of selectively-powered modules to perform power-up. On the other hand, power control manager 290 may keep processing core 230, memory controller 250 and nonvolatile memory 260 in the powered-down state.

When the configuration information of host 100 is written, since memory device 200 does not need to write or read the data on nonvolatile memory 260, memory controller 250 and nonvolatile memory 260 may not need to be powered-up. Also, since processing core 230 is not also used, it may not need to be powered-up. As a result, since power control manager 290 does not supply power to processing core 230, memory controller 250 and nonvolatile memory 260 (or supplies only the low power in the idle state or the standby state), the overall power consumption can be minimized.

Referring to FIG. 10a, the power consumption of a conventional memory device may be expressed by the sum of the power consumption in the active period and the power consumption in the idle period.

Despite the fact that the idle period is relatively longer than the active period, the power consumption of the active period may be very much greater than the power consumption of the idle period.

Even in the active period, when the command (CMD) is applied, the memory device consumes power at the active level (Active), and may consume power at the standby level (Standby) during waiting for the next command (CMD) after processing all commands (CMD). The power consumed at the standby level (Standby) may be greater than the power consumed at the idle level (Idle) during the idle period.

Therefore, the power consumption of the active level (Active) is inevitable during the processing of the command (CMD), but it is possible to reduce the overall power consumption by reducing the power consumed at the standby level (Standby).

Referring to FIG. 10b, the power consumption of a memory device in which the power consumed at the standby level (Standby) is reduced is illustrated.

Since the power consumed at the standby level (Standby) is reduced, the overall power consumption may be reduced, but the power-up delay (Power-up Latency) may be generated as an opposite effect. That is, there is a phenomenon in which, when the power consumed at the standby level (Standby) decreases, it takes increased time to return the power to the active level (Active). Therefore, the overall data processing performance of the memory device may also be degraded.

Referring to FIGS. 7 and 10c, the memory device 200 according to some embodiments disclosed herein do not transmit the command (CMD) to power control manager 290 through processing core 230, and memory access monitor 280 monitors first register 270 connected by host interface 210 and transmits the monitoring signal to power control manager 290. Accordingly, a relatively rapid power-up operation can be provided. Therefore, it is possible to reduce the power consumed at the standby level (Standby) without causing a power-up delay, and thereby minimize the overall power consumption of memory device 200.

Hereinafter, a memory device according to some embodiments will be described with reference to FIGS. 1, 11, and 12. The repeated parts of the aforementioned description are simplified or omitted.

Figure 11:
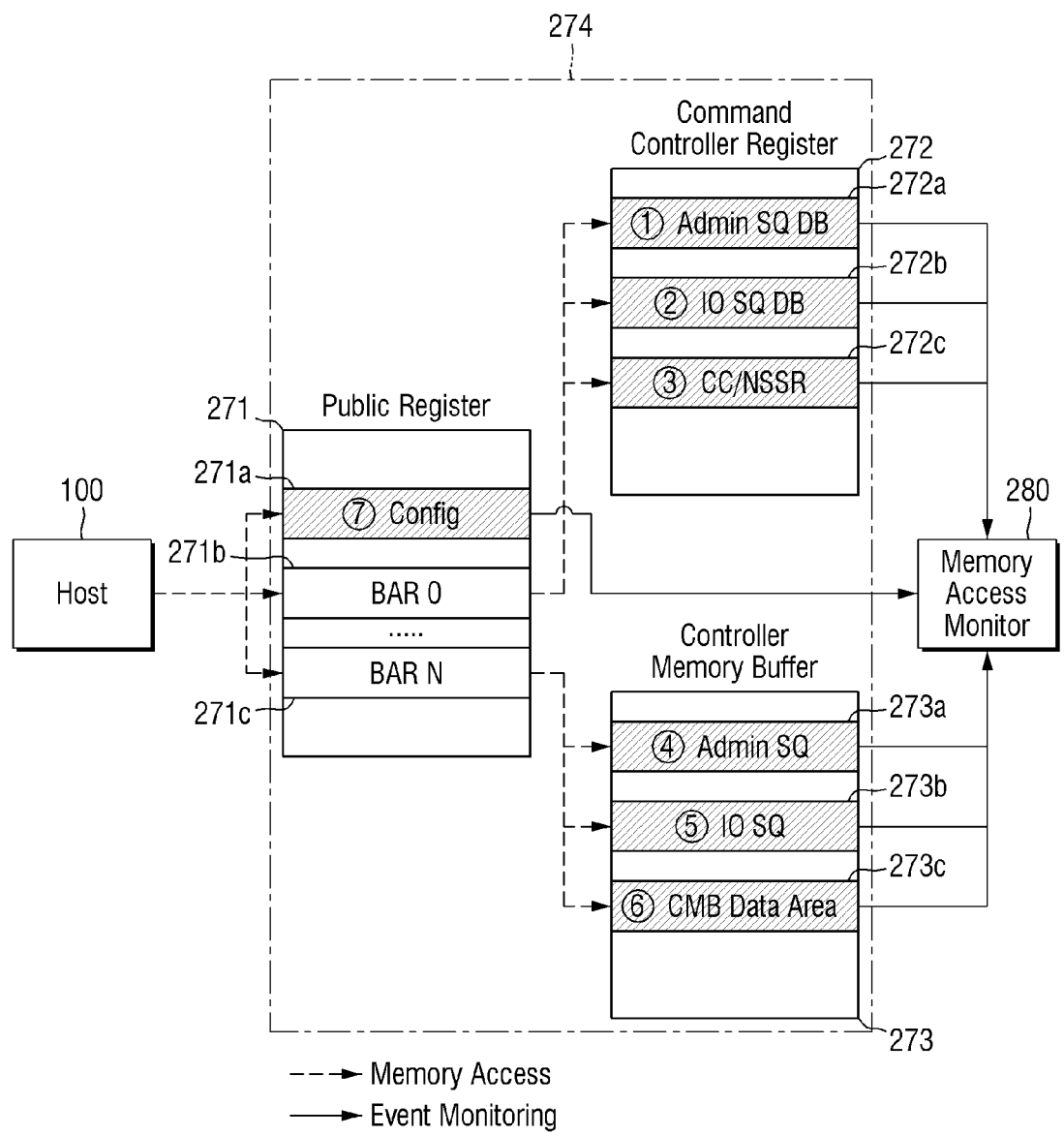
FIG. 11 is a block diagram for explaining the internal structure of the register of the memory device according to some embodiments.

FIG. 11 is a block diagram for explaining an internal structure of the register of the memory device according to some embodiments, and FIG. 12 is a table illustrating a power-up module for each region of the register in which the host performs the write operation according to some embodiments.

Referring to FIG. 11, memory device 200 according to some embodiments may include a second register 274 instead of first register 270 of FIG. 1.

Second register 274 may include a public register region 271, a command controller register region 272, and a controller memory buffer region 273.

Second base address register 271c of public register region 271 may include address information connected to controller memory buffer region 273. As a result, public register region 271 may indirectly connect host 100, command controller register region 272, and controller memory buffer region 273.

Since the explanation of command controller register region 272 is the same as described above, it will not be described again.

Controller memory buffer region 273 may include an administrator queue region 273a, an input/output queue region 273b, and a data region 273c.

Administrator queue region 273a may be a region in which an administrator command is written. As described above, when host 100 writes a command pointer in administrator command doorbell 272a, command controller 220 fetches a command corresponding to the command pointer from host 100. However, in the embodiments according to FIG. 11 which include second register 274 instead of first register 270, in order to save the time required by command controller 220 to fetch the command from host 100, host 100 may write the administrator command in advance in administrator queue region 273a of controller memory buffer region 273. That is, the time at which administrator queue region 273a is written may be earlier than the time at which administrator command doorbell 272a is written.

Input/output queue region 273b may be a region in which the input/output commands are written. As described above, when host 100 writes a command pointer in input/output command doorbell 272b, command controller 220 fetches the command corresponding to the command pointer from host 100. However, in the embodiments according to FIG. 11 which include second register 274 instead of first register 270, in order to save the time required by command controller 220 to fetch the command from host 100, host 100 may write the input/output command in advance in input/output queue region 273b of controller memory buffer region 273. That is, the time at which input/output queue region 273b is written may be earlier than the time at which input/output command doorbell 272b is written.

Data region 273c may be the remaining region of second register 274 provided to host 100. That is, since host 100 can directly access second register 274, second register 274 may provide a region which is freely usable by host 100. Data region 273c may be the region provided by second register 274 which is freely usable by host 100.

Memory access monitor 280 monitors administrator queue region 273a, input/output queue region 273b and data region 273c of controller memory buffer region 273, and may generate a monitoring signal (MS) of FIG. 1 depending on the region written to by host 100. Memory access monitor 280 may generate a first monitoring signal when host 100 writes to a first region of second register 274, may generate a second monitoring signal when host 100 writes to a first region of second register 274, etc.

In conclusion, memory access monitoring 280 may monitor configuration region 271a in public register region 271 of second register 274, administrator commands doorbell 272a, input/output command doorbell 272b and reset control region 272c in command controller register region 272, and administrator queue region 273a, input/output queue region 273b and data region 273c in controller memory buffer region 273, and may detect a region to which host 100 writes. Memory access monitor 280 may generate the monitoring signal (MS) through the detection.

Referring to FIGS. 11 and 12, since the cases of (1), (2), (3), and (7) are the same as the cases of (1), (2), (3), and (4) of FIG. 9, respectively, a further description of those cases will be omitted, and the cases of (4), (5), and (6) will be described.

(4): When host 100 performs writing in administrator queue region 273a of controller memory buffer region 273 of second register 274, power control manager 290 may select command controller 220, processing core 230, and volatile memory 240 as the selected power-up group (G) of selectively-powered modules to perform power-up. On the other hand, power control manager 290 may keep the memory controller 250 and the nonvolatile memory 260 in the powered-down state.

When the administrator command of host 100 is received, since the memory device 200 does not need to write or read data in nonvolatile memory 260, memory controller 250 and nonvolatile memory 260 may not need to be powered-up. As a result, since power control manager 290 does not supply power to memory controller 250 and nonvolatile memory 260 (or supplies only the low power in an idle state or a standby state), it is possible to minimize the overall power consumption of memory device 200.

(5): When host 100 performs writing in the input/output queue region 273b of controller memory buffer region 273 of second register 274, power control manager 290 may select command controller 220, processing core 230, volatile memory 240, memory controller 250, and nonvolatile memory 260 as a selected power-up group (G) of selectively-powered modules to perform power-up. That is, power control manager 290 may supply power to all modules of memory device 200.

When the input/output command of host 100 is received, since memory device 200 needs to write or read the data in nonvolatile memory 260, the power-up of memory controller 250 and nonvolatile memory 260 may be naturally required. Thus, power control manager 290 may supply power to memory controller 250 and nonvolatile memory 260 to perform power-up of the overall necessary modules.

(6): When host 100 performs writing in data region 273c of controller memory buffer region 273 of second register 274, power control manager 290 may select command controller 220 and volatile memory 240 as the selected power-up group (G) of selectively-powered modules to perform power-up. On the other hand, power control manager 290 may keep processing core 230, memory controller 250 and nonvolatile memory 260 in the powered-down state.

When host 100 writes to data region 273c, this is for host 100 to utilize, and a command is not transmitted to memory device 200. Thus, since there is no need to write or read the data in nonvolatile memory 260, memory controller 250 and nonvolatile memory 260 may not need to be powered-up. Also, since processing core 230 is not also used, it may not need to be powered-up. As a result, since power control manager 290 does not supply power to processing core 230, memory controller 250 and nonvolatile memory 260 (or supplies only the low power in the idle state or the standby state), the overall power consumption of memory device 200 can be minimized.

In memory device 200 according to the present embodiment, second register 274 includes a controller memory buffer region 273, and memory access monitor 280 monitors controller memory buffer region 273. Thus, even before the doorbell write, a power-up operation may occur, and the speed of the power-up operation can be further increased. This makes it possible to prevent occurrence of a power-up delay.

Hereinafter, a power control method for a memory device according to some embodiments of the present invention will be described with reference to FIGS. 1, 6, 8, and 13. The repeated parts of the above description will be simplified or omitted.

Figure 13:
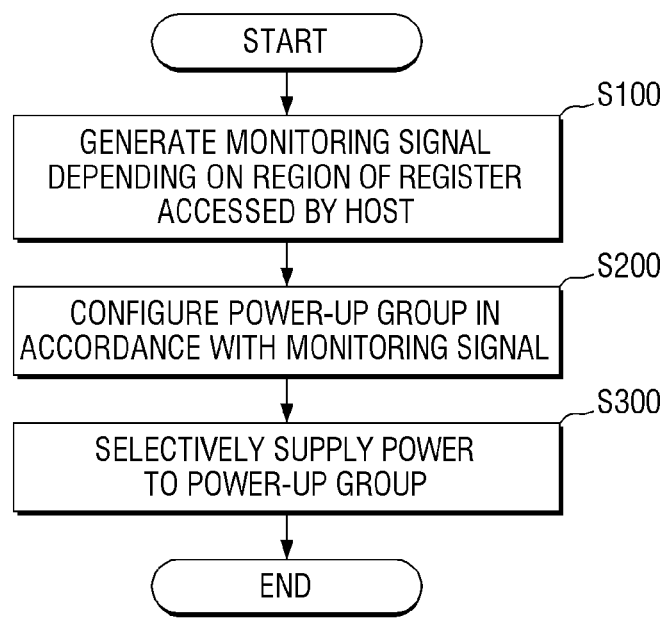
FIG. 13 is a flowchart illustrating a power control method of a memory device according to some embodiments.

FIG. 13 is a flowchart illustrating a power control method of a memory device according to some embodiments.

Referring to FIG. 13, first, a monitoring signal is generated depending on which region of the register the host has accessed (S100).

More specifically, referring to FIG. 1, memory access monitor 280 may monitor the internal region of first register 270. That is, since first register 270 can be directly accessed by host 100 via host interface 210, memory access monitor 280 may monitor which region of first register 270 host 100 has accessed.

Memory access monitor 280 may generate the monitoring signal (MS) depending on which region of first register 270 host 100 has accessed. The monitoring signal (MS) may include information on whether host 100 accesses a specific region in first register 270. Memory access monitor 280 may transmit the monitoring signal (MS) to power control manager 290.

Referring again to FIG. 13, a power-up group is configured in accordance with the monitoring signal (S200).

Specifically, referring to FIGS. 1 and 6, the power-up group (G) may be a group including at least one of command controller 220, processing core 230, volatile memory 240, memory controller 250 and nonvolatile memory 260. That is, the power-up group (G) may be a group for power control manager 290 to selectively supply power.

Referring again to FIG. 13, power is selectively supplied to the power-up group (G) (S300).

More specifically, referring to FIGS. 1 and 6, when power control manager 290 provides the power to the power-up group (G), the voltage and the frequency of an AC power source which provides the power can be adjusted. Power control manager 290 may determine the optimum voltage and frequency by the monitoring signal (MS).

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the invention.

What is claimed is:

1. A memory device, comprising:
a host interface configured to receive a command from a host and to control an access of the host to the memory device;
a register which is accessible by the host and includes a plurality of regions;
a memory access monitor configured to monitor which region of the plurality of regions of the register the host accesses; and
a power control manager configured to control power supplied to a module of the memory device depending on the region of the plurality of regions of the register the host accesses,
wherein the plurality of regions include an administrator command doorbell in which a command pointer of an administrator command is written, an input/output command doorbell in which a command pointer of an input/output command is written, a reset control region in which a command pointer of a reset command is written, and a configuration region in which configuration information of the host interface is written, and
wherein the administrator command doorbell, the input/output command doorbell, the reset control region, and the configuration region are different from each other.

2. The memory device 2, wherein the memory access monitor is further configured to generate a monitoring signal that indicates whether the host accessed the register.

3. The memory device 3, wherein the power control manager is further configured to adjust a power level of the power supplied to the module of the memory device in accordance with the monitoring signal, and
the power level is adjusted by changing a frequency of an AC power source which provides the power.

4. The memory device 2, wherein the module of the memory device comprises a first group and a second group different from the first group,
the power control manager is configured to control power supplied to the first group of the module of the memory device to be a first power and control power supplied to the second group of the module of the memory device to be a second power depending on the region of the plurality of regions of the register the host accesses, and
a level of the first power is different from a level of the second power.

5. The memory device 2, wherein the module of the memory device comprises a first group and a second group different from the first group,
the power control manager is configured to control power to not be supplied to the first group of the module of the memory device and control power to be supplied to the second group of the module of the memory device depending on the region of the plurality of regions of the register the host accesses.

6. The memory device of claim 1, wherein the module of the memory device is at least one of the host interface, a command controller which is configured to decode the command received from the host, a processing core which is configured to execute the decoded command, a volatile memory which is accessible by the processing core, a nonvolatile memory which is configured to store data, and a nonvolatile memory controller which is configured to control the nonvolatile memory.

7. A memory device, comprising:
a host interface configured to receive a command from a host and to control an access of the host to the memory device;
a register which is accessible by the host and includes a plurality of regions;
a memory access monitor configured to monitor which region of the plurality of regions of the register the host accesses; and
a power control manager configured to control power supplied to a module of the memory device to be a first power when the host accesses a first region of the register and control power supplied to the module of the memory device to be a second power when the host accesses a second region of the register,
wherein a level of the first power is different from a level of the second power,
wherein the first region is one of the plurality of regions,
wherein the second region is one of the plurality of regions different from the first region, wherein the plurality of regions include an administrator command doorbell in which a command pointer of an administrator command is written, an input/output command doorbell in which a command pointer of an input/output command is written, a reset control region in which a command pointer of a reset command is written, and a configuration region in which configuration information of the host interface is written, and wherein the administrator command doorbell, the input/output command doorbell, the reset control region, and the configuration region are different from each other.

8. The memory device of claim 7, wherein the first region is one of the administrator command doorbell or an administrator queue region in which the administrator command is written, the second region is one of the input/output command doorbell or an input/output queue region in which the input/output command is written, and the level of the first power is less than the level of the second power.

9. The memory device of claim 8, wherein the module of the memory device includes at least one of a nonvolatile memory which is configured to store data and a nonvolatile memory controller which is configured to control the nonvolatile memory.

10. The memory device of claim 7, wherein the second region is one of the input/output command doorbell or an input/output queue region in which the input/output command is written, the second region is the reset control region, and the level of the first power is greater than the level of the second power.

11. The memory device of claim 10, wherein the module of the memory device includes at least one of a volatile memory, a nonvolatile memory which is configured to store data and a nonvolatile memory controller which is configured to control the nonvolatile memory.

12. The memory device of claim 7, wherein the first region is one of the administrator command doorbell or an administrator queue region in which the administrator command is written, the second region is the reset control region, and the level of the first power is greater than the level of the second power.

13. The memory device of claim 12, wherein the module of the memory device includes a volatile memory.

14. The memory device of claim 13, wherein the level of the second power is a level of power of an idle state or a standby state of the volatile memory.

15. A memory device, comprising:

a register which includes a plurality of regions;

a memory access monitor which is configured to monitor which region of the plurality of regions of the register a host performs a write operation; and a power control manager configured to adjust a level of power supplied to a module of the memory device depending on the region of the plurality of regions of the register the host performs the write operation, wherein the plurality of regions include an administrator command doorbell in which a command pointer of an administrator command is written, an input/output command doorbell in which a command pointer of an input/output command is written, a reset control region in which a command pointer of a reset command is written, and a configuration region, and wherein the administrator command doorbell, the input/output command doorbell, the reset control region, and the configuration region are different from each other.

16. The memory device 15, further comprising:

a host interface which is configured to receive a command from the host and which is further configured to control an access of the host to the memory device, and a command controller which is configured to decode the command, wherein the plurality of regions includes a command controller register region which receives the command pointer and reports a presence of the command to the command controller.

17. The memory device of claim 16, wherein the command controller register region comprises the administrator command doorbell, the input/output command doorbell, and the reset control.

18. The memory device of claim 17, wherein the plurality of regions further comprises a controller memory buffer region which stores and provides the administrator command and the input/output command to the command controller.

19. The memory device of claim 18, wherein the controller memory buffer region comprises:

an administrator queue region in which the administrator command is written;

an input/output queue region in which the input/output command is written; and a data region provided for the host.

20. The memory device of claim 19, wherein a writing time of the controller memory buffer region is earlier than a writing time of the command controller register region.

* * * * *